Feb. 11, 1936.　　　J. W. LEIGHTON　　　2,030,750
RESILIENT JOINT
Filed Sept. 22, 1934　　2 Sheets-Sheet 1

Inventor.
John Wycliffe Leighton.

Feb. 11, 1936.   J. W. LEIGHTON   2,030,750
RESILIENT JOINT
Filed Sept. 22, 1934   2 Sheets-Sheet 2
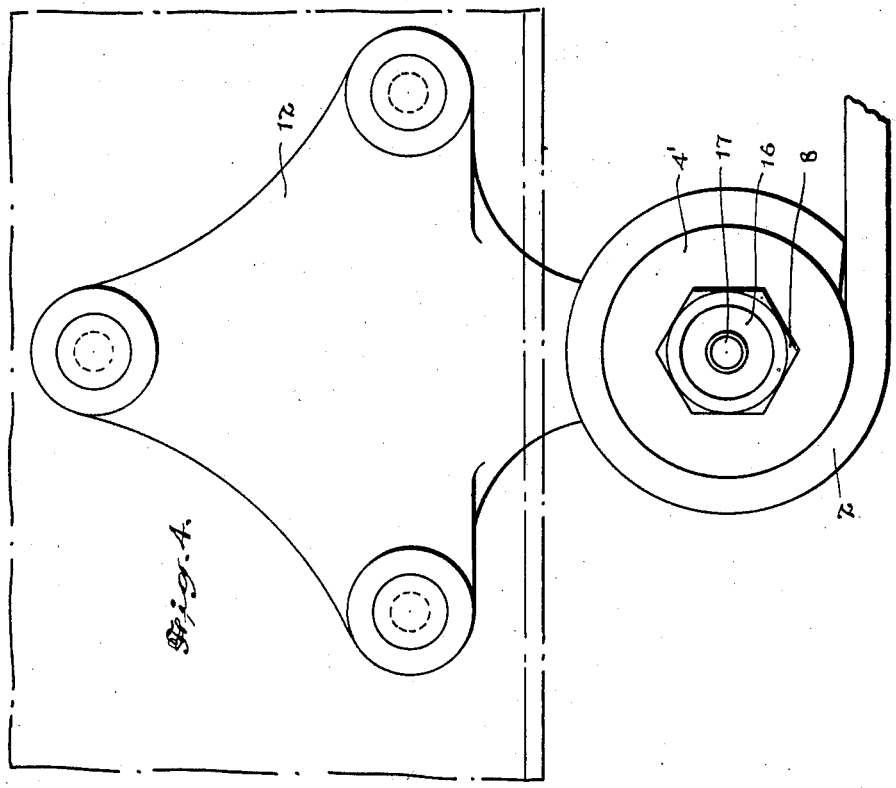
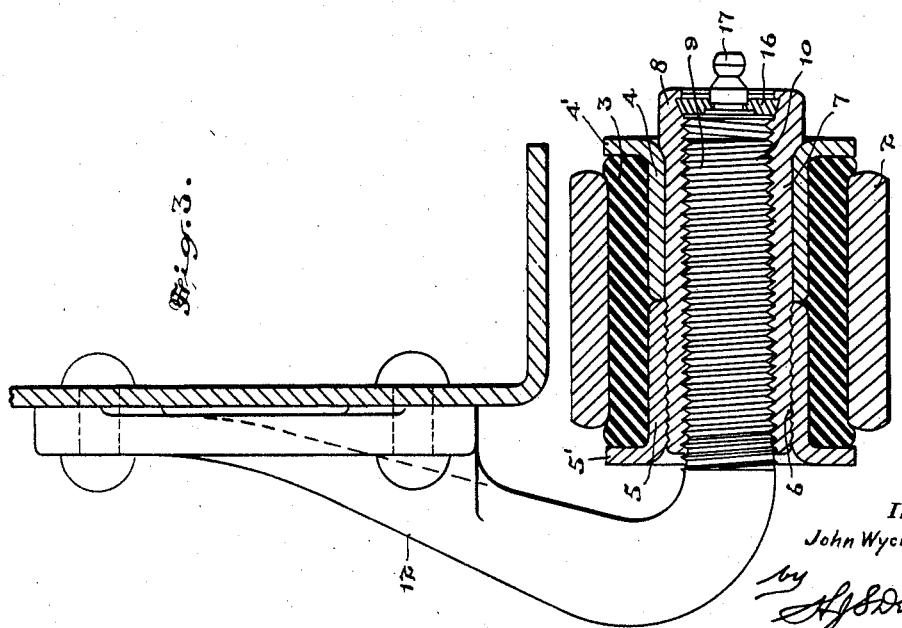
Inventor:
John Wycliffe Leighton Patented Feb. 11, 1936

2,030,750

UNITED STATES PATENT OFFICE 2,030,750

RESILIENT JOINT

John Wycliffe Leighton, Port Huron, Mich.

Application September 22, 1934, Serial No. 745,040

6 Claims. (Cl. 287—85)

The principal object of this invention is to provide a joint particularly applicable to the connection between a vehicle frame and spring whereby the transference of sounds from the running gear to the frame will be minimized and stresses in the metal parts will be greatly relieved.

The principal feature of the invention consists in the novel manner of assembling a body of resilient material such as rubber, into an enclosure surrounding the journal connection between the vehicle frame and the spring whereby sound and other vibrations emanating from the running gear are absorbed and a free swinging movement between the frame and spring is assured by the mounting of a bearing sleeve within the rubber mounting.

A further and important feature consists in the novel manner of securing the rubber mounting and the journal member in position in the frame whereby a pair of sleeve members are drawn into pressure contact with the rubber bushing to expand it into its enclosure through the endwise movement of a bearing bushing threaded into one of the aforesaid sleeves.

In the accompanying drawings, Figure 1 is a sectional elevational view of a spring shackle assembled in bearings in a spring end and frame bracket in accordance with this invention.

Figure 3 is a sectional elevational view of a frame bracket and spring end assembled thereon in a bearing support constructed in accordance with this invention.

Figure 4 is an elevational view of the structure illustrated in Figure 3.

It has been previously proposed to provide flexible joints between the spring end of a vehicle and the shackles and frame brackets by forcing bushings of resilient material into constricted areas between a fixed and a movable element, or perhaps between two movable elements, and it has been the practice to force such bushings by longitudinal pressure into a constricted annular area.

It is found however, that such structures have detrimental features, such for instance, as that which is created by the twisting action between the relatively movable members, exercising a torsion upon the rubber element which results in the magnification rather than the elimination of certain types of vibration.

Figure 1:
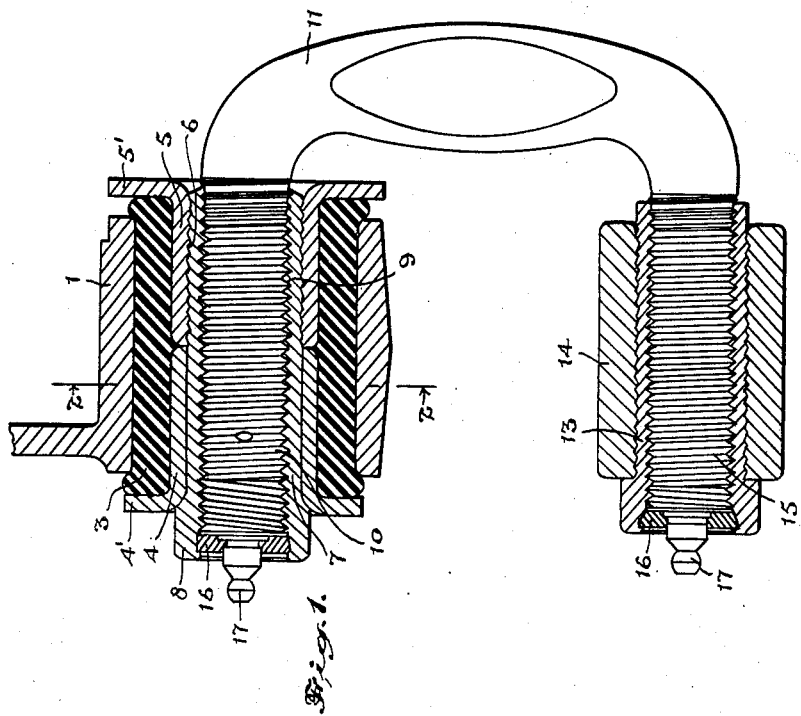

According to the present invention, the frame bracket 1 shown in Figure 1, or the spring eye 2 shown in Figure 3 has inserted thereinto a bushing 3 of rubber or other suitable elastic material. Within this bushing 3 is inserted from each end the bushings 4 and 5 of metal which are preferably formed with the outwardly turned flanges 4' and 5' to engage the ends of the rubber bushing 3 projecting beyond the frame bracket or spring eye.

The inner cylindrical surface of the bushing 5 is threaded preferably with a broad flat thread 6.

A bushing 7 which may be formed of bronze or a hardened steel to present a desirable bearing surface, is formed to fit snugly with a turning fit in the ferrule 4 and it has a flanged end 8 which engages the shoulder at the outward end of the ferrule 4, while the opposite end of the bushing 7 is formed with a broad, flat thread to correspond with the thread formed in the interior of the ferrule 5. The flanged end 8 of the bushing 7 is preferably formed with a nut head 9 to permit it being turned, and when the bearing sleeve is inserted through the ferrule 4 into the ferrule 5 and is rotated, the engagement of the threaded surfaces of the bushings 7 and 5 first brings the flanged head 8 into contact with the flanged end of the bushing 4, and then draws the bushing or ferrules 4 and 5 toward each other. This movement brings the flanges 4' and 5' into pressure engagement with the ends of the resilient bushing 3, compressing the material thereof between the exterior of said bushings and the inner wall of the orifice in the frame bracket or spring eye.

With this construction it is important to note that the inner bushing 7 is freely rotatable within the surrounding sleeves 4 and 5 which separate it from the rubber bushing 3 so that the axial compression is easily applied to the resilient body, since none of the parts are in rotational contact with the resilient body, the bushing 7 being easily rotatable within the sleeves 4 and 5 free of frictional contact with the resilient body and the bushing 7 will be effectively retained in its assembled position in the sleeve 5 by the locking effect of the shallow broad flat inter-engaging thread surfaces which will be retained in clutching contact by reason of the resilient reactive thrust set up by the axially compressed resilient body.

The inner wall 9 of the bushing 7 is preferably threaded to receive the threaded end 10 of the shackle 11 or frame bracket 12, the ends of which are threaded to form a threaded bearing contact with the interior of the bushing 7.

Figure 2:
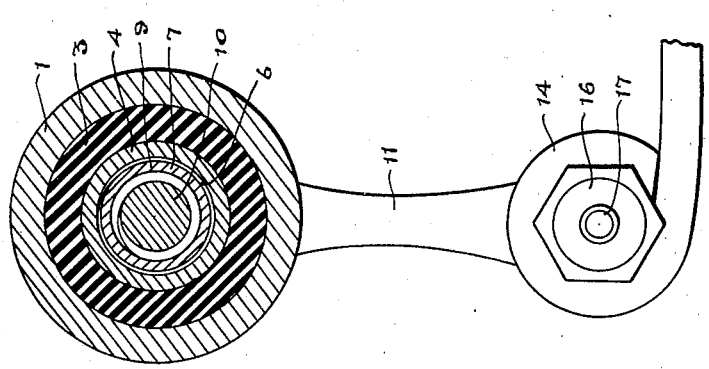
Figure 2 is a part elevational and part sectional view made on the line 2—2 of Figure 1.

In the form of the device shown in Figures 1 and 2, a bushing 13 is threaded into the spring eye 14 and has an internally threaded bearing surface to engage in bearing contact with the threaded end 15 of the shackle 11.

In both instances the threaded bearing bushings are closed at the outer ends by discs 16 provided with lubricating fittings 17 of a suitable design.

It will be appreciated that the lubricant for the engaging oscillating bearing surfaces is fed in from the outer end of the bushing and is required to work along the entire threaded bearing surface of the shackle or frame bracket before it escapes. Very little, if any, lubricant will escape this end, but it will be noted that the flange 5' of the ferrule enclosing the rubber bushing 3 extends well over the end of the rubber so that the oil or grease escaping will be thrown clear of the rubber material so as not to deteriorate same.

It will be understood from this description that all movements of the springs will be conveyed to the frame of the vehicle through the medium of a metal-to-metal journal supported in a resilient bushing. The metal-to-metal journal permits free movement of the members, while the rubber bushing absorbs the vibration and relieves excess stresses on the members.

The relative movement between the oscillatable members is therefore free of torsion, consequently the supports will be quite smooth and all tendency to "jiggle" will be eliminated through the elimination of the twisting effect in the rubber where two movable members are bound together by a rubber element.

This invention has been particularly described as being applied to the connection between a motor vehicle frame and its supporting spring structures, but it will be understood that the joint may be applicable to many other uses.

What I claim as my invention is:—

1. A resilient joint comprising an enclosing member, a journal bearing supported in said member, a resilient bushing surrounding said journal bearing, a pair of ferrules interposed between said journal bearing and said resilient bushing and having outwardly flanged ends overlapping the end faces of said resilient bushing in confining engagement, means for relatively moving said flanged ferrules axially to confine said bushing under axial compression between the respective flanged ends, and a member oscillatably mounted in said journal, said outwardly flanged ferrule ends being adapted to serve additionally as a protective means to restrict travel of lubricant from the journal to the ends of said resilient bushing.

2. A resilient joint comprising an enclosing member, a bushing having a journal orifice and a threaded exterior, a flanged ferrule loosely surrounding said bushing, a flanged ferrule threaded on said bushing, a resilient bushing surrounding the aforesaid bushing between said ferrule flanges, and an oscillatable member journalled in the journal orifice of said first mentioned bushing, said threaded bushing and threaded flanged ferrule being relatively rotatable to compress said resilient bushing.

3. A resilient joint comprising an enclosing member, a bushing having a threaded bearing orifice and an external shoulder at one end and a threaded external surface at the other end, a flanged ferrule encircling said bushing and engaging the shoulder thereof, a flanged ferrule threaded on the externally threaded end of said bushing, a rubber bushing housed in said enclosing member and compressed between said ferrule flanges, and a support member having a threaded end journalled in the threaded bearing surface of said bushing.

4. In a resilient joint of the type in which a resilient bushing is compressed about a bearing bushing, a bearing bushing, constrictable bushing-compressing means mounted on said bearing bushing and separating the latter from contact with said resilient bushing, means for adjusting said constrictable means on the rotation of said bushing relative thereto to determine the degree of compression of said resilient bushing, and a member oscillatably mounted in said bearing bushing.

5. In a resilient joint of the type in which a resilient bushing is compressed about a bearing bushing, means for compressing said resilient bushing including a flanged ferrule or sleeve threadedly telescoped by said bearing bushing, said bearing bushing being supported clear of frictional contact with said resilient bushing whereby it may be easily rotated to axially adjust the said flanged sleeve thereon and control the compression of said resilient bushing, and a member oscillatably mounted in said bearing bushing.

6. Means as claimed in claim 5 in which the inter-engaging threads of said bearing bushing and flanged sleeve are of the broad flat locking type whereby the compression set up in said resilient bushing is utilized to resiliently retain the shallow locking threads of the bearing bushing and sleeve in wedging locking contact to prevent accidental unthreading of said bearing bushing from said sleeve.

JOHN WYCLIFFE LEIGHTON.